Jan. 23, 1951  C. E. BRANICK  2,538,962
FLUID PRESSURE-OPERATED TIRE BEAD LOOSENING TOOL
Filed Sept. 17, 1947  2 Sheets-Sheet 1

Inventor
Charles E. Branick
By his Attorneys
Merchant & Merchant

Jan. 23, 1951 C. E. BRANICK 2,538,962
FLUID PRESSURE-OPERATED TIRE BEAD LOOSENING TOOL
Filed Sept. 17, 1947 2 Sheets-Sheet 2
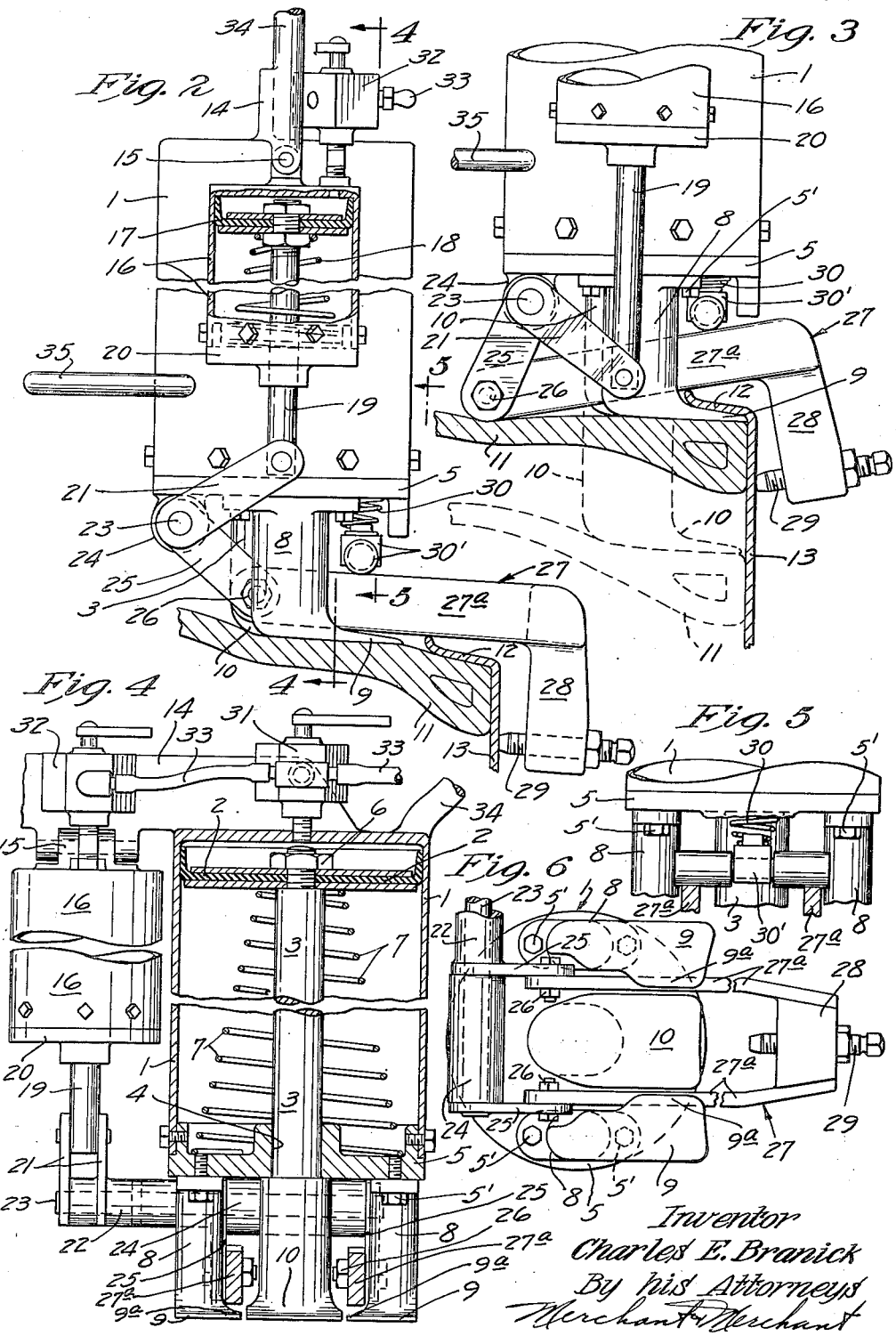

Patented Jan. 23, 1951

2,538,962

UNITED STATES PATENT OFFICE 2,538,962

FLUID PRESSURE-OPERATED TIRE BEAD LOOSENING TOOL

Charles E. Branick, Fargo, N. Dak.

Application September 17, 1947, Serial No. 774,566

6 Claims. (Cl. 157—1.17)

My invention relates broadly to tire demounting tools, and more specifically to tools of the type generally known in the trade as "bead breakers" and which tools are used to forcibly separate the beads of tires from the rim flanges, particularly when the beads have become rusted or frozen thereto.

An important object of my invention is the provision of a device of the type immediately above-described, which has great strength and which is relatively light in weight.

Another object of my invention is the provision of a tire demounting tool which is relatively simple to manufacture, easy to operate, and which is of such sound construction that it can be operated by air without damage to the operator.

The above and numerous other objects of my invention will become apparent from the following detailed specification, appended claims, and attached drawings.

Referring to the drawings, wherein like characters indicate like parts throughout the several views:

Fig. 2 is an enlarged fragmentary view in side elevation with some parts being broken away and some parts being shown in section, illustrating its application to a tire-equipped wheel rim;

Fig. 3 is a fragmentary view corresponding somewhat to Fig. 2, but showing a different position of some of the parts;

Fig. 4 is a view partly in section and partly in side elevation, taken substantially on the line 4—4 of Fig. 2;

Fig. 5 is a fragmentary detail, partly in side elevation and partly in section, taken substantially on the line 5—5 of Fig. 2; and Fig. 6 is a bottom plan of my tire demounting tool, some parts being broken away.

Figure 1:
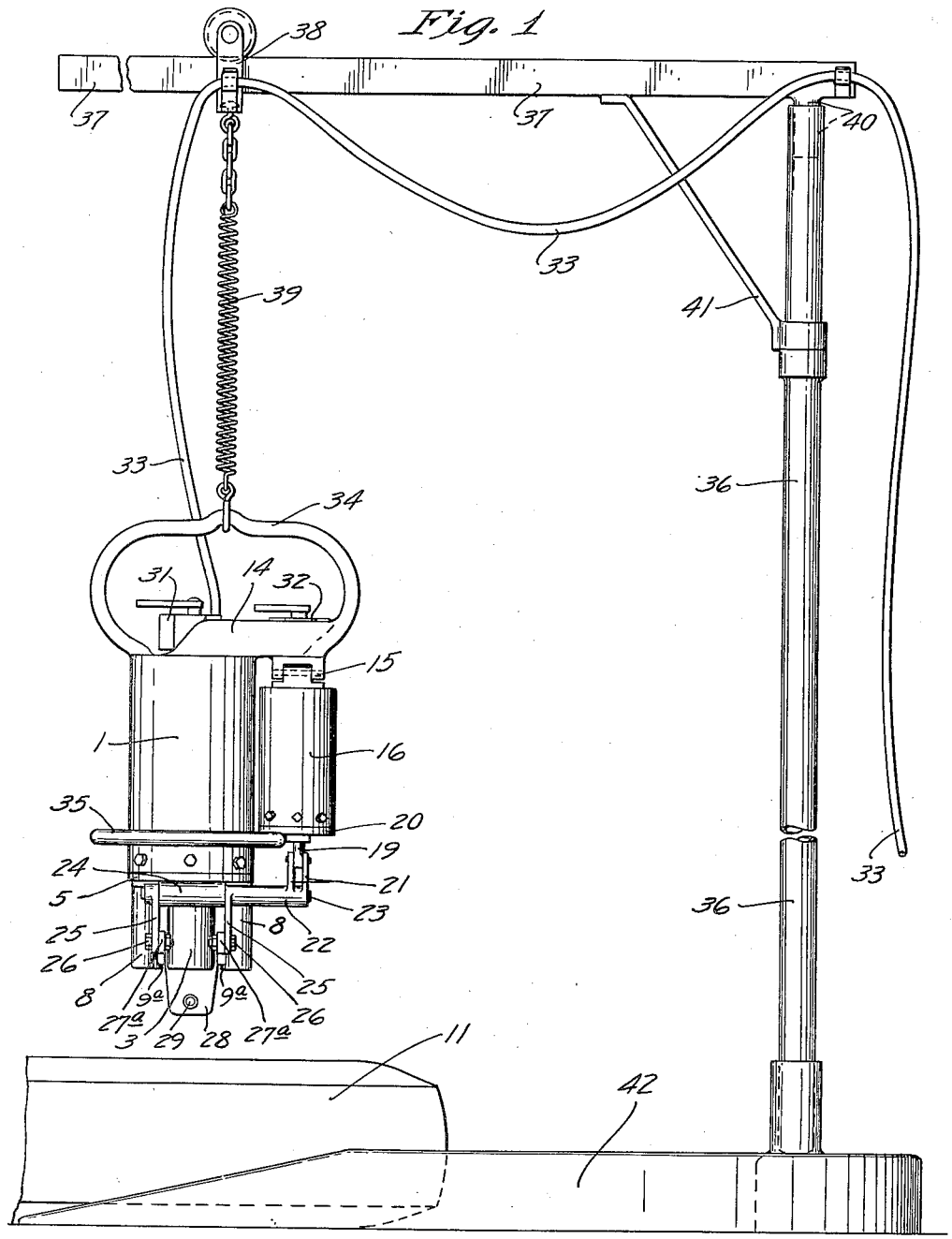
Fig. 1 is a view in side elevation illustrating my novel device and one means of mounting or supporting the same for use.

Referring with greater particularity to the drawings, the numeral 1 indicates a main body portion in the nature of a cylinder. A piston 2 is mounted for reciprocal movements within the cylinder 1 and is provided with a plunger 3 which operates through an opening 4 in the removable head 5 at the base of the cylinder 1. Plunger 3 is secured to the piston 2 by means of a nut or the like 6 and is retracted to the position shown in Fig. 4 by means of a coil compression spring 7.

A pair of substantially parallel laterally-spaced leg elements 8 are secured to the bottom 5 of the piston 1 by means of screws 5' and extend normally downwardly therefrom and terminate in enlarged laterally-extended foot portions 9 at their free ends. The plunger 3, which is also in the nature of a leg, is also provided at its free end with a foot portion 10 which extends laterally in the same direction as, and is adapted to work between, the foot portions 9. As will be noted with reference to Fig. 4, when the spring 7 has moved the piston and plunger to the position of Fig. 4, the foot elements 9 and 10 are in substantially the same plane so as to facilitate their insertion between the bead of a tire 11, and the flange 12 of the rim 13 (see Figs. 2 and 3).

Referring particularly to Figs. 1 and 4, it will be seen that cylinder 1 is formed at its upper end with a laterally-projecting flange or bracket 14, to the lower side of which is pivotally secured, as indicated at 15, a secondary cylinder 16, preferably and as shown, of smaller size than cylinder 1. Plunger-equipped piston 17 is mounted in cylinder 16 for extending and retracting movements. Spring 18 normally biases said piston toward plunger-retracted position, as indicated in Fig. 2. The free end of the plunger 19, which works through a removable head 20 in the bottom of cylinder 16, extends between and is pivotally secured to the outer end of a bifurcated crank arm 21. The inner end of the bifurcated crank arm 21 is secured by welding or the like to a sleeve 22 fast on a shaft 23, which is, in turn, journalled in a bearing boss 24 on the lower side of the cylinder head 5. A pair of crank arms 25 are secured one to the sleeve 22 and the other to the outer free end of the shaft 23 on opposite ends of the bearing boss 24. The outer free ends of the crank arms 25 are pivotally secured, as at 26, to a movable clamping member in the nature of an arm 27. Clamping member 27 is in the nature of a pair of spaced clamping arms 27a joined at their outer ends by a downturned portion in the form of a common head 28. Head 28 is provided with an inwardly-projecting abutment end portion in the form of a set screw 29.

It will be seen, particularly with reference to Figs. 4 and 6, that the feet 9 have laterally-extending portions 9a which underlie the arms 27a and support the clamping element 27 in a substantially horizontal position when the device is not in use. The clamping element 27 is biased toward engagement with the foot portions 9 by a coil compression spring 30 interposed between the under face of the cylinder head 5 and a roller-equipped presser foot 30'.

Air under pressure, to extend the pistons 2 and 17 within their respective cylinders 1 and 16, is admitted to said cylinders through separate three-way valves 31 and 32 respectively. These valves are of the type shown in my prior Patent No. 2,310,892 and permit air to be forced under pressure from a source not shown through a conduit 33 in one position of said valve, and in another position thereof allow air to escape from the cylinders to the atmosphere.

This device makes a compact unit relatively light in weight as compared to tools heretofore utilized for this purpose, and may, therefore, be handled with a minimum of effort. Preferably, I provide a loop-forming handle 34, which is secured at one end to the bracket or flange 14 and at its other end to the upper end of cylinder 1. A second handle 35 is preferably in the form of a loop and is secured to the cylinder 1 adjacent its lower end. By means of these handles 34 and 35, this tool can be maneuvered and transported. However, where it is possible to bring the rim-equipped tire to the tool, I find a convenient method of mounting the tool is by suspending the same from a crane 36 having a laterally-extending arm 37. As shown, the tool is suspended from a roller-equipped bracket 38 by a coil tension spring 39. The bracket 38 is adapted to traverse the arm 37 to position the device. The arm 37 has a depending stub shaft 40, which is rotatively mounted in the upper end of the vertical portion of the crane 36, and is further braced against the vertical portion by means of a bearing-equipped bracket 41. The bottom end of the vertical member of the crane 36 is adapted to be seated in the socket of any suitable stand such as the one illustrated and which is identified by the numeral 42 or in the base 5 of the structure of my co-pending application, S. N. 595,782, filed May 25, 1945, and now Patent No. 2,448,414.

When it is desired to put my novel structure into operation, the tire 11 is placed in any suitable position such as indicated in Fig. 1. The operator then bears down upon the handles 34 and 35 until the clamping element 27 and the feet 9 and 10 are in the position indicated in Fig. 2. Thereafter, and in order to force the feet 9 and 10 between the flange 12 and the beads of the tire 11, as indicated by the full lines of Fig. 3, the three-way valve 32 is manipulated so as to permit air under pressure to enter the cylinder 16. When this takes place, the piston 17 and associated plunger 19 are extended to rotate the crank arms 24 and 25 and position the clamping member 27, as there indicated.

While the clamping member 27 is in this position and under sustained air pressure in the cylinder 16, the air valve 31 is manipulated to allow air under pressure to enter the cylinder 1 so as to force the plunger-equipped piston 2 and the feet 10 to the dotted line position of Fig. 3, thus effectively separating the bead of the tire 11 from the rim flange 12. When the bead of the tire 11 has been separated from the flange 12, the valves 31 and 32 are moved to positions wherein air is allowed to escape from the cylinders 1 and 16 respectively to atmosphere, whereupon under bias of the springs 7 and 18, the plunger-equipped pistons 2 and 17, and their associated parts, will be retracted to the normal positions of Fig. 2. The complete operation requires but a few seconds, and this operation may be repeated a number of times on any given tire, where it is found necessary. It will be noted that the spring-pressed roller-equipped presser foot biases the clamping element 27 in a direction to effectively prevent the abutment portion of the clamping element from slipping from the free end of the rim 13.

While I have disclosed a preferred embodiment of my invention, as provided by section 4888 of the United States Statutes, it should be obvious that this invention is quite capable of modification without departure from the scope of the appended claims.

What I claim is:

1. In a device of the class described, a generally cylindrical main body, a foot-equipped leg element secured to one end of said body, a fluid-operated piston working in said cylindrical body, said piston being provided with a foot-equipped plunger extending outwardly in closely-spaced parallel relationship to said leg, means yieldingly biasing said piston in a direction to position said feet in side-by-side relationship for common insertion between the rim flange and the bead of a pneumatic tire, said piston being movable against bias of said means to move one of said feet away from side-by-side relationship with the other thereof in a direction axially of said cylindrical body whereby to forcibly separate the tire bead from the rim flange, a clamping arm extending transversely of said legs and having an offset abutment portion at its outer end overlapping and spaced from the free ends of said feet for engagement with the inside of a tire rim against the flange of which said feet are inserted, a secondary cylinder mounted on said main body, a fluid-operated plunger-equipped piston working in said cylinder, linkage pivotally connecting the outer end of said last-mentioned plunger with the inner end of said clamping arm whereby to move said offset abutment toward and from said feet, and means biasing said abutment away from said feet.

2. In a device of the class described, a generally cylindrical main body, a foot-equipped leg element secured to one end of said body, a fluid-operated piston working in said cylindrical body, said piston being provided with a foot-equipped plunger extending outwardly in closely spaced parallel relationship to said leg, means yieldingly biasing said piston in a direction to position said feet in side-by-side relationship for common insertion between the rim flange and the bead of a pneumatic tire, said piston being movable against bias of said means to move one of said feet away from side-by-side relationship with the other thereof in a direction axially of said cylindrical body whereby to forcibly separate the tire bead from the rim flange, a clamping arm extending transversely of said legs and having an offset abutment portion at its outer end overlapping and spaced from the free ends of said feet for engagement with the inside of a tire rim against the flange of which said feet are inserted, a secondary cylinder mounted on said main body, a fluid-operated plunger-equipped piston working in said cylinder on an axis generally parallel to the cylindrical main body, a bell crank having its intermediate portion pivotally secured to said main body and having its free ends pivotally secured one each to the outer end of said last-mentioned plunger and the inner end of said clamping arm, whereby reciprocal movements of said last-mentioned piston will cause the abutment portion of said clamping arm to move toward and away from said feet, and means yieldingly biasing said last-mentioned piston to move the abutment end of said clamping arm away from said feet.

3. The structure defined in claim 2 in which the abutment end of said clamping arm is provided with an adjustable head.

4. The structure defined in claim 2 in which the intermediate portion of said clamping arm is adapted to bear upon the upper surface of one of said feet whereby to maintain said arm in a substantially horizontal position when not in use.

5. In a device of the class described, a generally cylindrical main body, a pair of leg elements secured to said main body and projecting generally outwardly therefrom in substantially parallel relationship, said legs terminating at their outer ends in spaced feet which project outwardly therefrom at substantially right angles, a fluid-operated piston working in said cylindrical body, said piston being provided with a plunger, said plunger operating between said feet and terminating at its free end in an operating foot, means yieldingly biasing said piston in a direction to position all three of said feet in side-by-side relationship for common insertion between the rim flange and the bead of a pneumatic tire, said piston being movable against bias of said means to move the intermediate foot away from side-by-side relationship with the other two thereof in a direction axially of said cylindrical body whereby to forcibly separate the bead from the rim flange, a clamping member extending transversely of said legs intermediate said main body and said feet, said clamping member comprising spaced arms which straddle said plunger and bear one each upon the upper surface of said outer feet under the action of gravity, said clamping arms at their free ends being provided with a downturned abutment portion which overlies and is spaced from the free ends of said feet for engagement with the inside of a tire rim against the flange of which said feet are inserted, a secondary cylinder carried by said main body, a fluid-operated plunger-equipped piston working in said secondary cylinder, a bell crank pivotally secured at its intermediate portion to said main body and having its free ends secured one each to the inner end of said clamping arm and projected outer end of said last-mentioned plunger, whereby reciprocal movements of said plunger will cause the abutment portion of said clamping arm to move toward and away from said feet, and means biasing said last-mentioned piston toward a position to cause said abutment portion to move away from said feet.

6. The structure defined in claim 5 in further combination with anti-friction means intermediate said main body and said clamping arm biasing said clamping arm in a direction away from said main body.

CHARLES E. BRANICK.

REFERENCES CITED

The following references are of record in the file of this patent:

UNITED STATES PATENTS

| Number | Name | Date |
|---|---|---|
| 941,543 | Sistek et al. | Nov. 30, 1909 |
| 1,452,596 | DeFernelment | Apr. 24, 1923 |
| 1,475,519 | Snider | Nov. 27, 1923 |
| 1,519,558 | Snider | Dec. 16, 1924 |
| 1,806,947 | Mjelva | May 26, 1941 |
| 2,281,476 | Casey | Apr. 28, 1942 |
| 2,365,151 | Solomon | Dec. 19, 1944 |
| 2,402,022 | Corbell | June 11, 1946 |
| 2,413,010 | Teegarden | Dec. 24, 1946 |

OTHER REFERENCES

Popular Mechanics Magazine, page 95, June 1941.